United States Patent [19]
van den Goor

[11] Patent Number: 5,427,223
[45] Date of Patent: Jun. 27, 1995

[54] CONVEYOR

[75] Inventor: Jakobus M. van den Goor, Eindhoven, Netherlands

[73] Assignee: Vanderlande Industries Nederland B.V., Veghel, Netherlands

[21] Appl. No.: 254,792

[22] Filed: Jun. 6, 1994

[30] Foreign Application Priority Data

Jun. 8, 1993 [NL] Netherlands .................. 9300982

[51] Int. Cl.⁶ .............................................. B65G 47/46
[52] U.S. Cl. ........................... 198/365; 198/370.02; 198/370.01
[58] Field of Search .................. 198/365, 370, 372

[56] References Cited

U.S. PATENT DOCUMENTS

| | | | |
|---|---|---|---|
| 4,732,260 | 3/1988 | Canziani | 198/365 |
| 5,191,959 | 3/1993 | Leemkuil | 198/365 |
| 5,285,886 | 2/1994 | Rudiger et al. | 198/370 |

Primary Examiner—Joseph E. Valenza
Attorney, Agent, or Firm—Oblon, Spivak, McClelland, Maier & Neustadt

[57] ABSTRACT

The invention relates to a conveyor comprising a frame and drivable transport means, provided with carriers extending transversely to the direction of movement of the transport means, parallel to each other. The carriers are pivotally coupled to at least one flexible coupling means, whilst at least some of said carriers support pusher shoes. A pusher shoe is connected to a group of three guide wheels positioned at the side of a respective carrier remote from the pusher shoe, which guide wheels are capable of cooperating with a guide rail extending at an angle to the intended direction of movement of the carriers. At least one of the guide wheels of a group of guide wheels is capable of cooperating with a guide rail at a lower level than another guide wheel, whereby at least part of a guide rail is designed to have a height such that at least one of the guide wheels of a group is positioned higher than the upper end of the part in question of the guide rail.

7 Claims, 2 Drawing Sheets

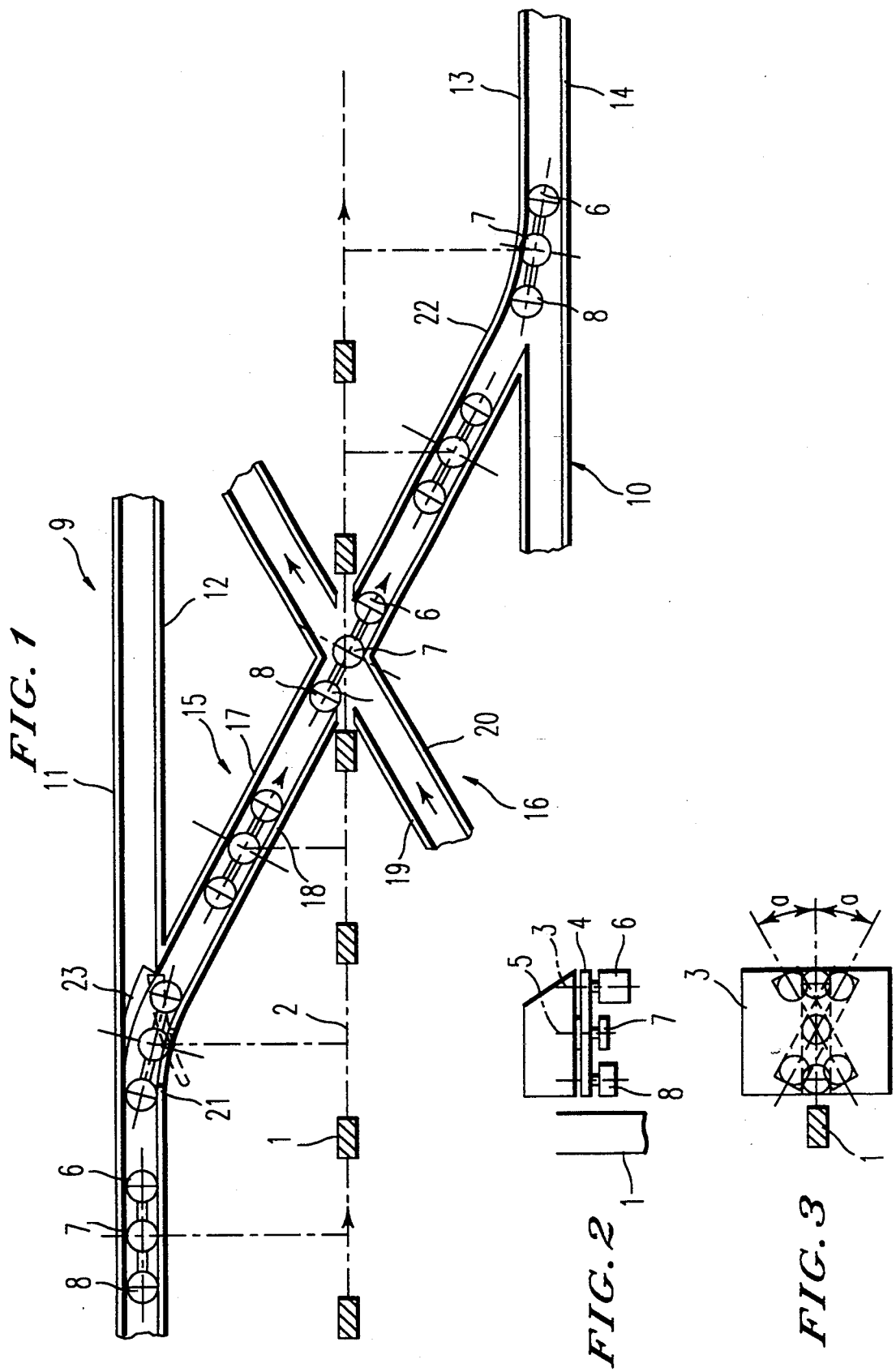

CONVEYOR

BACKGROUND OF THE INVENTION

1. Field of the Invention

The invention relates to a conveyor comprising a frame and drivable transport means, provided with parallel carriers extending transversely to the direction of movement of the transport means, each said carriers being pivotally coupled to at least one flexible coupling means, whilst at least some of said carriers support pusher shoes, whereby a pusher shoe is connected to a group of three guide wheels positioned at the side of a respective carrier remote from the pusher shoe, which guide wheels are capable of cooperating with a guide rail extending at an angle to the intended direction of movement of the carriers.

2. Description of the Related Art

A conveyor of this type is known from British Patent Application No. 2,057,381. This known conveyor comprises three guide wheels, which all have the same height. This known construction has several disadvantages. For example, the guide wheels can be guided along a guide rail on one side only. Also when a switch means is being passed, all three guide wheels must furthermore have passed the switch before the position of the switch means can be changed.

SUMMARY OF THE INVENTION

According to the invention at least one of the guide wheels of a group of guide wheels is capable of cooperating with a guide rail at a lower level than another guide wheel, and at least part of a guide rail is designed to have a height such that at least one of said guide wheels is positioned higher than the upper end of the part in question of the guide rail.

By using the construction according to the invention a particularly efficient guiding of the guide wheels along the rails can be obtained, whilst at the same time it offers a far greater range of applications than the known construction.

BRIEF DESCRIPTION OF THE DRAWINGS

The invention will be explained in more detail hereafter with reference to a few embodiments of the construction according to the invention diagrammatically illustrated in the accompanying Figures.

FIG. 1 is a diagrammatic plan view of rails forming part of a conveyor according to the invention and of guide wheels cooperating with said rails.

FIG. 2 is a diagrammatic side view of a pusher shoe with a group of three guide wheels connected thereto.

FIG. 3 is a diagrammatic plan view of FIG. 2, indicating the maximum pivoting angle of the support for supporting the guide wheels.

DETAILED DESCRIPTION OF THE PREFERRED EMBODIMENTS

Figure 4:
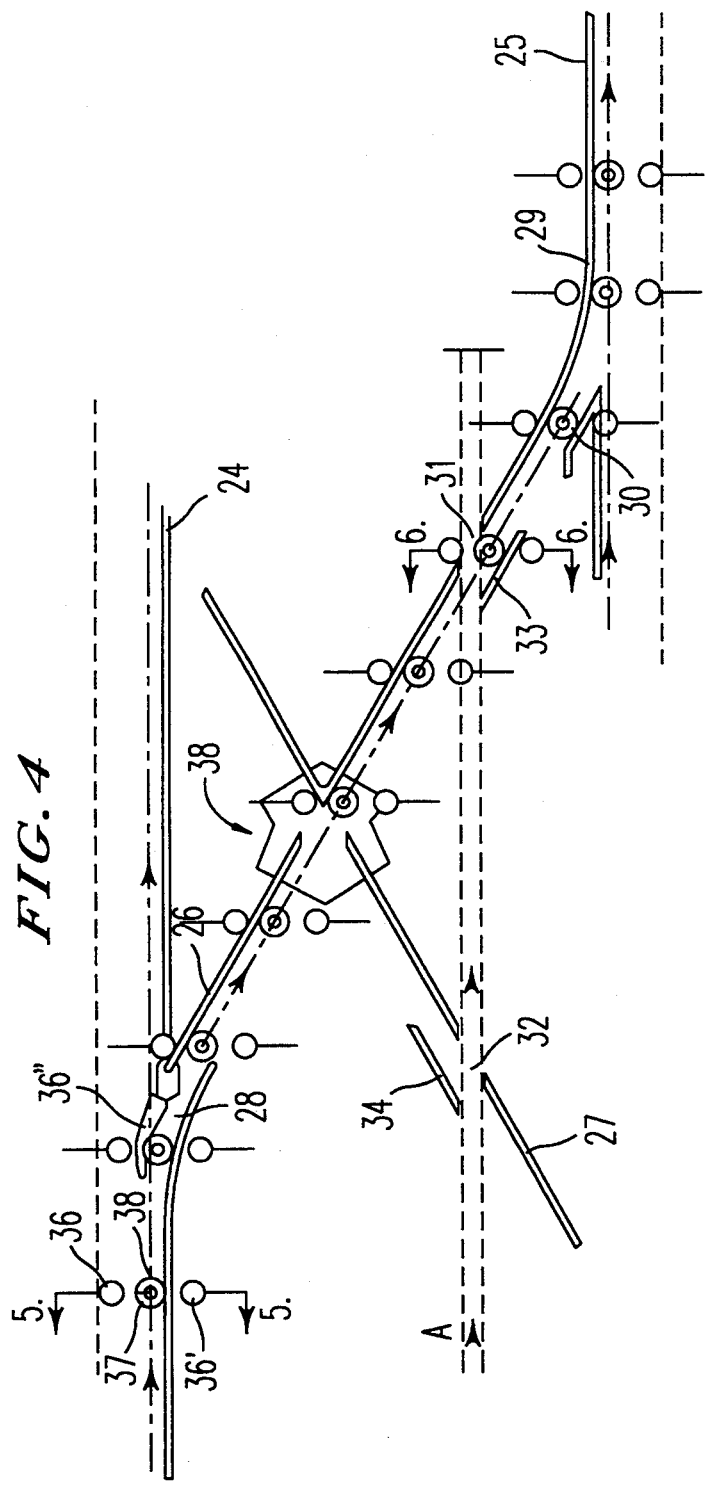
FIG. 4 is a diagrammatic plan view of guide rails and guide wheels cooperating therewith of a further embodiment of a conveyor according to the invention.

The construction according to the invention is in particular intended for use in a conveyor wherein the carriers supporting the pusher shoes are connected, by means of connecting pieces 1, to a single, centrally arranged transport chain 2 (only diagrammatically indicated), which can be driven in the direction according to the arrow A during operation.

It will be apparent, however, that the invention may also be used in conveyors wherein the carriers supporting the pusher shoe are near their ends connected to transport chains or the like flexible coupling means.

A pusher shoe 3 (diagrammatically indicated in FIGS. 2 and 3) may be connected to a carrier in a manner known per se, in such a manner that said pusher shoe is movable along the respective carrier in the longitudinal direction of said carrier. Constructions of this type are generally known, as appears for example from the aforesaid British Patent Application No. 2,057,381 or for example from Dutch Patent Application No. 9000393.

As is furthermore shown in FIG. 2, a support 4 is provided at the bottom side of the pusher shoe 3, said support being pivotable with respect to the pusher shoe about a pivot axis 5 extending in vertical direction (or perpendicularly) to the longitudinal direction of the carrier supporting the pusher shoe 3. Three guide wheels 6, 7 and 8 are coupled to said support. The guide wheel 7 is thereby freely rotatable about an axis of rotation coinciding with the pivot axis 5, whilst the guide wheels 6 and 8 positioned on either side of the guide wheel 7 are freely rotatable about axes of rotation extending parallel to the axis of rotation of the guide wheel 7.

As will be apparent from the Figures, the upper ends of the guide wheels 6–8 all lie substantially in the same plane, which extends perpendicularly to the axes of rotation. The front wheel 6, seen in the intended direction of movement according to the arrow A, comprises the greatest height, however, and consequently reaches under the guide wheels 7 and 8 running behind said front wheel. The middle guide wheel 7 comprises the smallest height, whilst the rear guide wheel is higher than the guide wheel 7, but less high than the guide wheel 6.

Near the sides of the conveyor two guideways 9 and 10 for the guide wheels are provided, said guideways extending in the intended direction of movement. The guideway 9 is thereby defined by two guide rails 11 and 12 extending parallel to each other, whilst the guideway 10 is defined by two guide rails 13 and 14.

In order to be able to move the pusher shoes with respect to the carriers supporting the pusher shoes, guideways 15 and/or 16 extending at an angle to the intended direction of movement according to the arrow A may be provided. The guideway 35 is defined by two guide rails 17 and 18, whilst the guideway 16, which intersects the guideway 15 in the embodiment shown in FIG. 1, is defined by two guide rails 19 and 20. As will be apparent from the Figure, the rails are interrupted near the intersection of the two guideways 15 and 16.

The height of the various guide rails, at least along the larger part of their length, may be such that all wheels 6–8 are guided by both guide rails of a guideway through which said wheels are moving. Near the junction of a guideway 15 or 16 extending at an angle to the intended direction of movement according to the arrow A and a guideway 9 or 10, the height of a bend 21 between the rail 12 and the rail 18, which is located at the inside of the connecting bend, or of a bend 22 between the rail 17 and the rail 13, which is located at the inside of the bend, is less than that of the other parts of the guide rails, all this in such a manner, that the middle guide wheel 7 can move over said bend 21 or whilst the guide wheels 6 and 8 positioned on either side of the guide wheel 7 are guided by said bend. When a group of wheels moves through the guideway 9 in the direction according to the arrow A, as indicated in FIG. 1, and the passage through the guideway 9 near the junction of guideway 15 and the guideway 9 is closed by means of a pivotable switch tongue 23, which is arranged in the position illustrated in full lines in FIG. 1 for that purpose, the front guide wheel 6 will come into contact with said switch tongue and be guided into the guideway 15. In spite of the fact that there are three guide wheels, the three guide wheels can smoothly pass the connecting bend between the guideway 9 and the guideway 15, since the middle guide wheel 7 can freely move over the bend 21, as explained above, whilst the front guide wheel 6 and the rear guide wheel 8 remain in contact with the respective guide rails 11, 12 and 17, 18.

Because the height of the rear guide wheel 8 is less than that of the guide wheel 6, the switch tongue 23 may be pivoted into the position illustrated in dotted lines, if desired, directly after the guide wheel 6 has passed the switch tongue 23, whereby the switch tongue moves under the guide wheel 8. Immediately after the largest guide wheel 6 has passed the passage through the guideway 9 may be released for a set of guide wheels running behind said guide wheel 6, therefore.

Also the intersection between the two guideways 15 and 16 can be passed without any impediment when the construction according to the invention is used.

At the moment when a pusher shoe 3 passes the intersection, at least one of said front and rear wheels will be positioned between the two guide rails 17 and 18, whilst one of said other guide wheels will be in contact with the guide rail 17 and the other with the guide rail 18, or one of said other guide wheels is also in contact with both guide rails 17 and 18, whilst the third wheel passes the intersection without being guided.

When the group of wheels passes from the guideway 15 into the guideway 10, the middle wheel will move over the bend 22 again, as described above, so that also here the passage of the group of wheels from the guideway 15 into the guideway 10 can take place without impediment.

Furthermore it will be apparent that groups of wheels moving through the guideway 10 in the direction according to the arrow A may similarly be diverted into the guideway 9 via the guideway 16, if desired.

As is furthermore diagrammatically indicated in FIG. 3, the angle through which the support 4 supporting the guide wheels 6–8 can be pivoted from the central position, which this group occupies when moving through a guideway 9 or a guideway 10, is limited to a predetermined angle, both in the one and in the other direction. This limitation to the pivoting movement has been provided in order to prevent the rear wheel 8 from pivoting too far, for example when passing from the guideway 9 into the guideway 15, as a result of which the rear wheel 8 might land into the part of the guideway 9 located downstream of the junction to the guideway 15.

Figure 6:
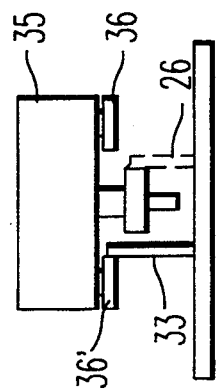
FIG. 6 is a sectional view of FIG. 4, along the line VI—VI in FIG. 4.
Figure 5:
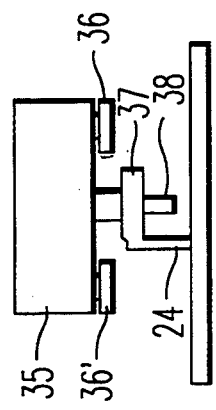
FIG. 5 is a sectional view of FIG. 4, along the line V—V in FIG. 4.

FIGS. 4–6 illustrate another embodiment of the construction according to the invention. In this conveyor a guide rail 24 is provided near one side, whilst a guide rail 25 is provided near the other side. Guide rails 26 and 27, which intersect each other, may be provided between these two guide rails 24 and 25.

The guide rail 24 is interrupted near the junction of the guide rail 26 and the guide rail 24, whilst a rail portion 28 extending parallel to the guide rail 26 joins the part of the guide rail 24 located upstream of said interruption, seen in the intended direction of movement of the carriers according to the arrow A, if desired.

The part of the guide rail 24 located downstream of the interruption is connected to the end of the guide rail 26.

Near the junction of the guide rail 26 and the guide rail 25 the guide rail 26 blends, via a bend 29, into the part of the guide rail 25 that is provided downstream of the interruption in the guide rail 25. If desired a rail portion 30 extending parallel to the guide rail 26 joins the part of the guide rail 25 located upstream of said interruption.

The design of the junctions of the guide rail 27 and the guide rails 25 and 24 respectively (not shown) will be similar to that of the junctions of the guide rail 26.

The guide rails 26 and 27 are formed with interruptions 31 and 32 respectively, which constitute a passage for connecting pieces corresponding with the connecting pieces 1, which connect the carriers supporting the pusher shoes to the flexible coupling means in the shape of a chain or the like.

Guide rail portions 33 and 34, which extend parallel to and spaced from the guide rails 26 and 27 respectively, are disposed near said interruptions 31 and 32, said rail portions projecting above said guide rails 26 and 27, as appears in particular from FIG. 6.

As is furthermore illustrated in FIGS. 5 and 6, three guide wheels 36, 36' and 37 are connected to each of the pusher shoes 35, said guide wheels being rotatable about axes of rotation extending parallel to each other and perpendicularly to the longitudinal direction of the carrier supporting the pusher shoe in question. The axes of rotation, which take up a fixed position with respect to the pusher shoe 35, lie in a plane extending perpendicularly to the intended direction of movement according to the arrow A thereby. As is apparent from FIG. 5, the middle guide wheel 37 of the three guide wheels is positioned lower than the two outer guide wheels 36 and 36'. Furthermore a guide pin 38 projecting under the guide wheel 36 is connected to the pusher shoe.

A pusher shoe 35 located near one end of the carrier with which it is moved in the direction according to the arrow A, will be guided along the guide rail 24 or the guide rail 25 with its guide wheel 37, as will be apparent in particular from FIG. 5.

If it is desired to guide a respective pusher shoe along a guide rail 26 or 27 extending at an angle to the direction of movement, a switch tongue 36" joining the guide rail 24 or 25 near the junction of the respective guide rail 26 or 27 may be pivoted from the position illustrated in dotted lines in FIG. 4, in which the wheel 37 can freely continue to move along the rails 24, into the position illustrated in full lines in FIG. 4, in which position, the guide pin 38 will come into contact with the switch tongue 36", as a result of which the guide pin 38 and thus the pusher shoe connected thereto will be moved transversely to the direction of movement according to the arrow A. When a bend is being rounded the pin 38 will initially move along the switch tongue 36", after which the wheel 37 is guided along the guide rail 26 and possibly the guide rail portion 28.

In the intersection 38 between the guide rails 26 and 27, in which intersection both the guide rail 26 and the guide rail 27 are interrupted, the pusher shoe is guided by means of the guide pin 38, whereby the construction of said intersection may for example be as described in Dutch Patent Application No. 9100847, whose contents are considered to be incorporated herein by this reference.

Upon passing the interruption 31 in the guide rail 26 the guide wheel 37 will briefly loose its contact with the guide rail 26. During this stage of the movement of the pusher shoe the guide wheel 36' will move along the guide rail portion 33, however, as shown in FIG. 6, so that an adequate guiding of the pusher shoe is ensured in this point as well. After this point has been passed the guiding of the pusher shoe is taken over again by the guide wheel 37 moving along the guide rail 26, which may be guided by the guide rail portion 30 as well as by the guide rail 26 at the Junction of the guide rail 26 and the guide rail 25.

It will be apparent, that the guiding of the guide wheels of a pusher shoe from the guideway defined by the guide rail 25, along the guide rail 27, into the guideway defined by the guide rail 24 will take place in a similar manner, whereby the guide wheel 36, when passing the interruption 32, will cooperate with the guide rail portion 34 projecting above the guide rail 27.

It will be apparent that a very simple construction has been obtained by using the construction according to FIGS. 4–6, since the guide wheels 36, 36' and 37 take up a fixed position with respect to the pusher shoe, whilst an efficient movement of the pusher shoe transversely to the intended direction of movement of the carrier supporting the pusher shoe can still be effected by means of the guide wheels, using simple means, whereby the outer guide wheels 36 and 36' can freely move over the rails cooperating with the wheel 37 near the junctions of the rails 26 and 27 to the rails 24 and 25.

I claim:

1. A conveyor comprising a frame and drivable transport means, provided with carriers extending transversely to the direction of movement of the transport means, parallel to each other, said carriers being pivotally coupled to at least one flexible coupling means, whilst at least some of said carriers support pusher shoes, whereby a pusher shoe is connected to a group of three guide wheels positioned at the side of a respective carrier remote from the pusher shoe, which guide wheels are capable of cooperating with a guide rail extending at an angle to the intended direction of movement of the carriers, characterized in that at least one of the guide wheels of a group of guide wheels is capable of cooperating with a guide rail at a lower level than another guide wheel, and at least part of a guide rail is designed to have a height such that at least one of said guide wheels is positioned higher than the upper end of the part in question of the guide rail.

2. A conveyor according to claim 1, characterized in that said guide wheels are secured to a respective pusher shoe by means of a support carrying the guide wheels, which is pivotable with respect to said pusher shoe about a pivot axis coinciding with the axis of rotation of the middle guide wheel, whilst the two outer guide wheels reach under the middle guide wheel and a lowered rail portion is provided at the connecting bend between a guide rail extending in the longitudinal direction of the conveyor and a guide rail extending at an angle to the intended direction of movement.

3. A conveyor according to claim 1 or 2, characterized in that, seen in the direction of movement of the carriers, the front guide wheel of a group of guide wheels reaches further under the middle guide wheel than the rear guide wheel, whilst a switch tongue is arranged at the junction of a guide rail extending at an angle to the intended direction of movement and a guide rail extending in the longitudinal direction of the conveyor, which switch tongue is capable of engaging said front guide wheel and moving under said rear guide wheel.

4. A conveyor according to claim 1, characterized in that an intersection between guide rails extending at an angle to the intended direction of movement, in which intersection said guide rails are interrupted so as to allow passage of a connecting piece connecting a carrier to the transport means, is designed such that when a group of guide wheels passes said intersection, at least one of said guide wheels is confined between two guide rails extending parallel to each other, and at least one further guide wheel is in contact with a guide rail.

5. A conveyor according to claim 1, characterized in that the axes of rotation of said three guide wheels take up a fixed position with respect to the associated pusher shoe, and lie in a plane extending at least substantially perpendicularly to the intended direction of movement, whereby the outer guide wheels are positioned higher than the upper sides of the guide rails with which the middle guide wheel cooperates, whilst a higher guide rail portion is arranged near an interruption in a guide rail extending at an angle to the intended direction of movement and cooperating with said middle guide wheel, downstream of said interruption and parallel to said guide rail, so as to cooperate with an outer guide wheel of the group of guide wheels in question.

6. A conveyor according to claim 2, characterized in that an intersection between guide rails extending at an angle to the intended direction of movement, in which intersection said guide rails are interrupted so as to allow passage of a connecting piece connecting a carrier to the transport means, is designed such that when a group of guide wheels passes said intersection, at least one of said guide wheels is confined between two guide rails extending parallel to each other, and at least one further guide wheel is in contact with a guide rail.

7. A conveyor according to claim 3, characterized in that an intersection between guide rails extending at an angle to the intended direction of movement, in which intersection said guide rails are interrupted so as to allow passage of a connecting piece connecting a carrier to the transport means, is designed such that when a group of guide wheels passes said intersection, at least one of said guide wheels is confined between two guide rails extending parallel to each other, and at least one further guide wheel is in contact with a guide rail.

* * * * *